United States Patent [19]

Roche

[11] 4,233,475
[45] Nov. 11, 1980

[54] TELEPHONE STATION WITH AUTOMATIC SWITCH-OVER BETWEEN PULSE CODE DIALLING AND MULTIFREQUENCY CODE DIALLING

[76] Inventor: Bernard G. Roche, 13, rue de Bourgogne, 22300 Lannion, France

[21] Appl. No.: 17,335

[22] Filed: Mar. 5, 1979

[30] Foreign Application Priority Data

Mar. 8, 1978 [FR] France ............................ 78 06683

[51] Int. Cl.³ .......................................... H04M 1/50
[52] U.S. Cl. ............................ 179/84 VF; 179/16 EC
[58] Field of Search .............. 179/84 VF, 90 K, 90 B, 179/2 DP, 16 EC

[56] References Cited

U.S. PATENT DOCUMENTS 3,988,549  10/1976  Merlin et al. ................... 179/90 K

*Primary Examiner*—Bernard Konick
*Assistant Examiner*—Joseph A. Popek
*Attorney, Agent, or Firm*—Abraham A. Saffitz

[57] ABSTRACT

A keyboard type telephone station connected to a telephone subscriber's line comprises a dial pulse train generator and a dialling multifrequency signal generator. The telephone station includes a control unit connected to at least one current threshold detector for the power level of supervisory or so-called tone signals. The supervisory signals are transmitted from the linking exchange on the telephone subscriber's line and indicate the beginnings of various call dialling phases in setting up a telephone communication. In response to the detection of the supervisory signal, the control unit blocks transmission of the pulse generator and releases transmission of the multifrequency generator, so that only the multifrequency generator transmits only the dialling multifrequency signal associated with the first key of the dialling phase. Then under automatical control of the control unit only the pulse generator transmits the dial pulse trains associated with said first key and with the subsequent keys of the dialling phase in response to further detection of the supervisory signal, or only the multifrequency generator transmits the dialling multifrequency signals associated only with the subsequent keys in response to the non-detection of the supervisory signal.

6 Claims, 4 Drawing Figures

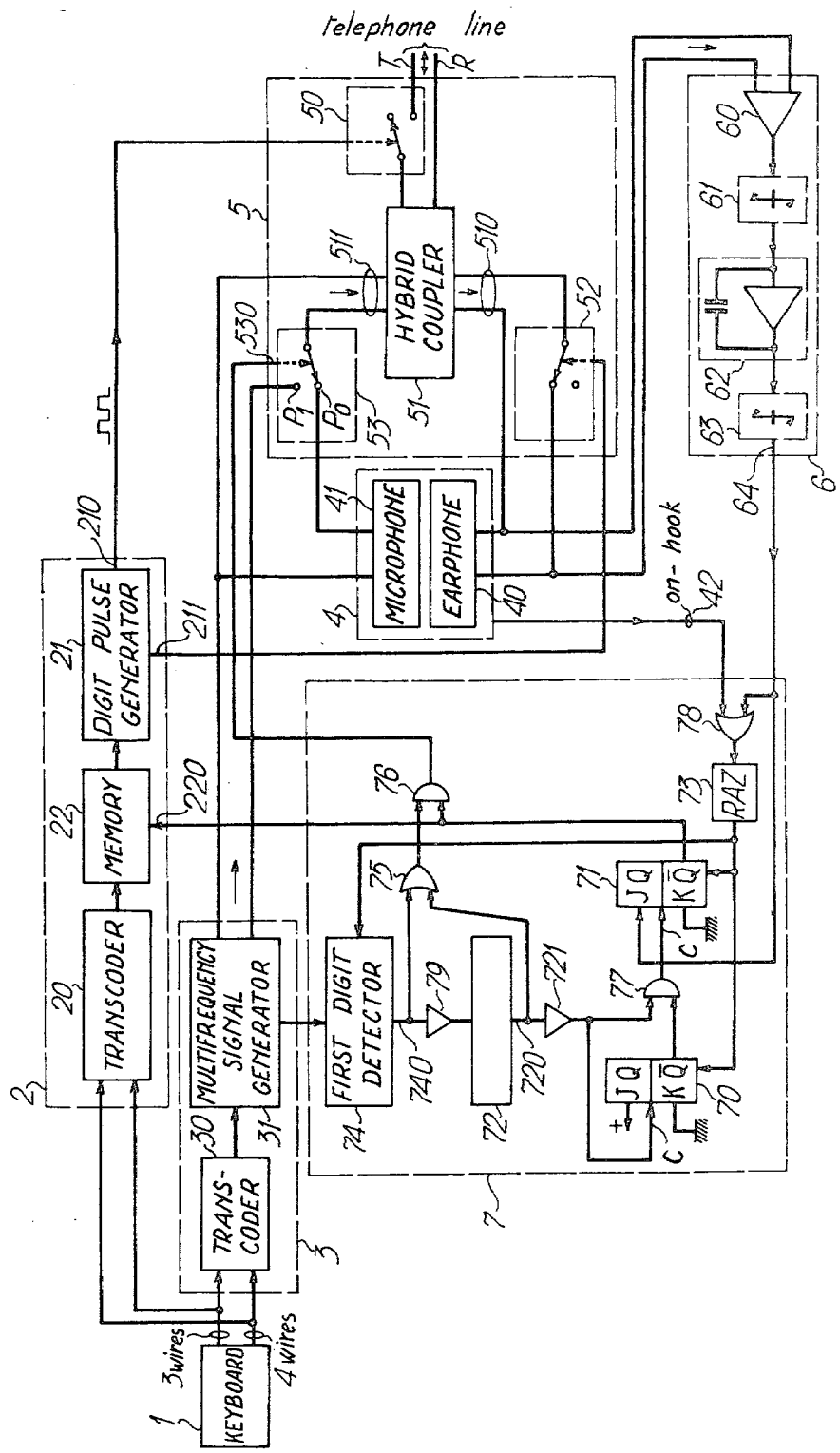

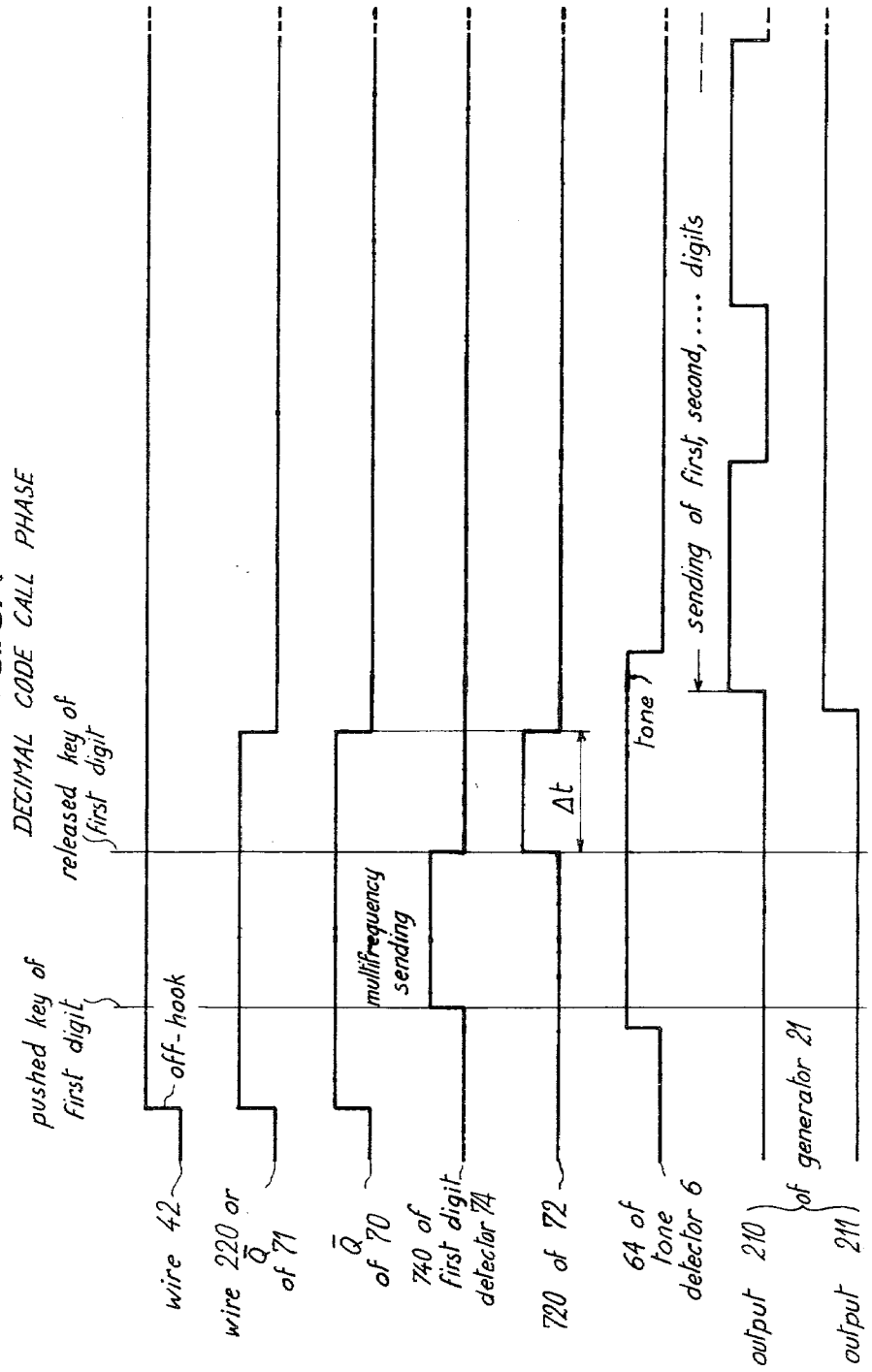

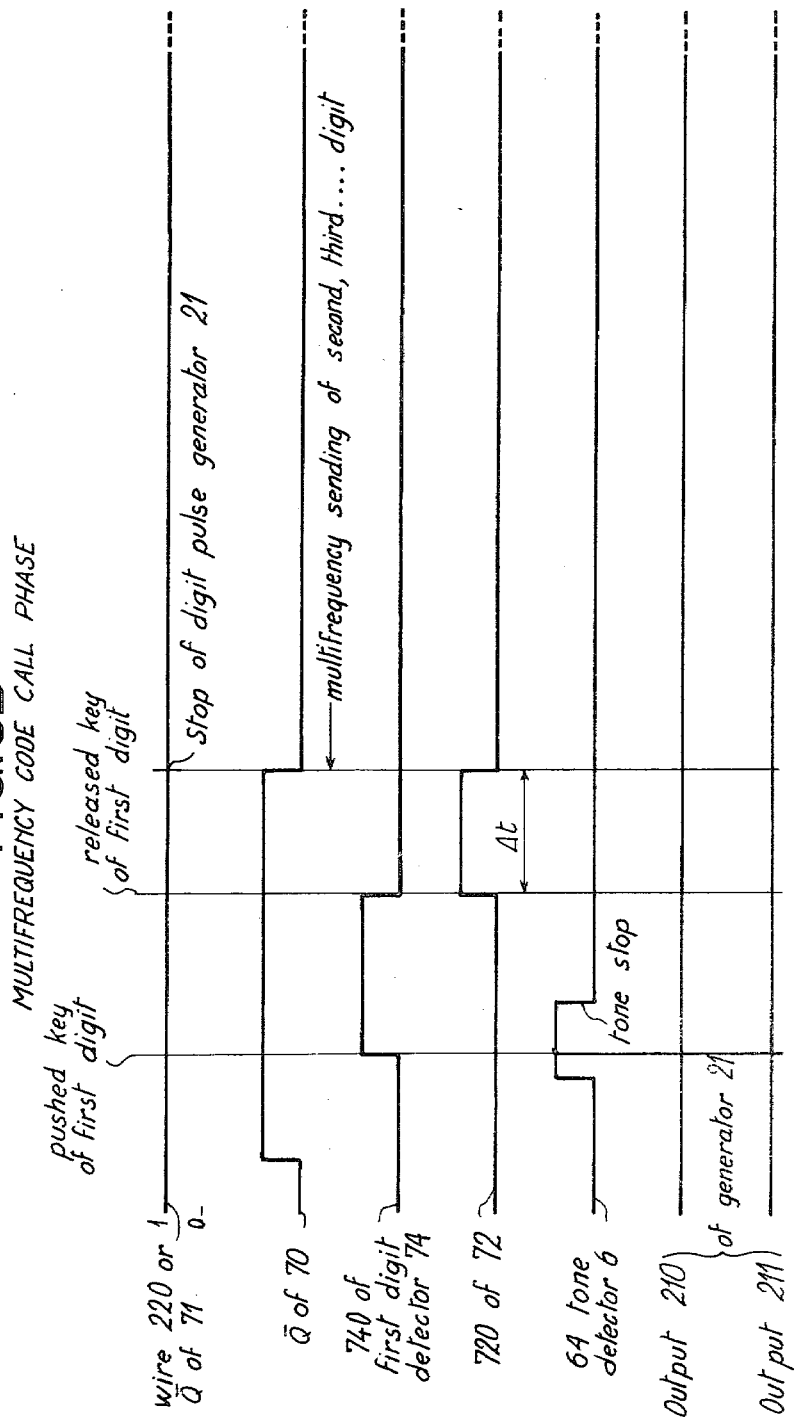

TELEPHONE STATION WITH AUTOMATIC SWITCH-OVER BETWEEN PULSE CODE DIALLING AND MULTIFREQUENCY CODE DIALLING

CROSS REFERENCES TO RELATED APPLICATIONS

Applicant hereby makes cross references to its French Patent Application PV 78 06683, filed Mar. 8, 1978 and claims priority thereunder following the provisions of 35 U.S.C. 119.

BACKGROUND OF THE INVENTION (a) Field of the Invention

The present invention relates to a telephone station which allows switch-over between dialling signal transmissions in pulse code and dialling signal transmissions in multifrequency code. This telephone station may be used as a data transmitter as well as a conventional telephone set which is connected to a telephone subscriber's line.

A such telephone station comprises a pulse code signal generator which produces decimal code pulse trains associated respectively with the numerals of the keys of the station keyboard and a multifrequency code signal generator which produces multifrequency code a.c. signals associated respectively with the keyboard keys.

(b) Description of the Prior Art

It is known that such a telephone station is designed to give domiciliary access to data processing and in addition to normal telephone communications with other telephone subscriber's stations also sets up telephone communications with data terminals. Generally, there are two method types for communicating with a data terminal, depending upon whether the linking telephone exchange possesses multifrequency code receivers or not. The first method consists of transmitting both the terminal call dialling phase and the data transmission phase in multifrequency code. The second method consists of transmitting the call dialling phase in decimal pulse code, then the data transmission phase in multifrequency code. The pulse code signals consist of decimal code pulse trains which are associated respectively with the keys of the keyboard and are generated by opening the loop of the telephone line which connects the telephone station to the exchange. Each multifrequency code signal represents the combination of two voice-frequencies out-of-8 which are associated with the keys of the keyboard respectively and are transmitted over the telephone line.

Known telephone stations accomplish the first method or the second method in setting up a telephone communication by manually disconnecting the pulse generator from the telephone line when the telephone station is connected to a telephone exchange which accepts only dialling signals completely in multifrequency code. For example, the telephone station described in U.S. Pat. No. 3,920,926 to George V. Lenaerts et al comprises in a first embodiment only a multifrequency generator for setting up communications in accordance with the first method, whereas in a second embodiment it comprises a multifrequency code a.c. signal generator and a decimal code pulse generator for setting up only communications in accordance with the second method. More advantageously, the telephone station disclosed in U.S. Pat. No. 3,988,549 to Jean-Claude Merlin et al comprises a multifrequency code a.c. signal generator and a decimal code pulse generator which is disconnected from the telephone line by disconnecting a connection strap for example when communications have to be set up in accordance with the first method.

In the case of telephone stations in which the second method is carried out, switching over from the pulse code to the multifrequency code is done either manually by means of an appropriate key on the keyboard which when pressed directly causes disconnection of the pulse generator from the telephone line after the complete call digit dialling, as described for example in the U.S. Pat. No. 3,920,926 or automatically on reception of a predetermined signal transmitted from the linking exchange to the telephone station after the call digit dialling. When the subscriber hangs up, the pulse generator is again connected to the telephone line. The predetermined signal is issued for example on detecting the reversal of the telephone station supply current, which happens in the majority of telephone exchanges when a communication has been set up after decimal dialling, as described in the U.S. Pat. No. 3,988,549, or on detecting a signal having a predetermined frequency which differs from the voice-frequencies defined by the multifrequency code and which is transmitted from the linking exchange over the telephone line between the telephone subscriber's station and the data terminal, as described in German Patent Application No. P 2,240,979 filed on Aug. 21, 1972.

Consequently, according to the prior art, each type of telephone exchange has to have connected to it a telephone station of a corresponding predetermined type which comprises for example a battery reversal detector or a predetermined frequency signal detector. This does not allow such a telephone station to be connected to the telephone exchanges of certain countries which do not carry out battery reversal or which do not include a predetermined frequency signal generator. This limits considerably the application of such telephone stations. Furthermore, automatic switching over of the multifrequency code and decimal pulse code must be authorized after a predetermined phase in setting up a communication and this does not allow a communication to be set up between such a telephone station and a data terminal by way of any present day public telephone network.

In this respect, in certain cases, according to the transmission features of the chain of telephone exchanges which make the telephone connection, one actually provides for the transfer from the pulse code to the multifrequency code that it can be made during the call digit dialling, for example after transmitting one of the international and national prefixes or linking or main telephone exchange code prefix. In this case, the aforesaid telephone stations do not authorize automatic switching of the codes at a determined phase in each communication, because for example the battery reversal or the detection of a predetermined frequency must be accomplished after the completion of the call dialling. Consequently, when the automatic switching of the codes must be accomplished, the telephone stations of the prior art, in accordance with the second method, will continue to transmit in pulse code. This will be interpreted in the exchange as an opening of the loop analogous to an on-hook and such communications will not be able to be set up.

OBJECTS OF THE INVENTION

Accordingly, the main object of this invention is to provide a telephone station which avoids the aforementioned problems of the prior art.

Another object of the invention is to provide a telephone station which accomplishes automatically the switching-over from the decimal pulse code to the multifrequency code whatever the call transmission features of the telephone exchanges of the telephone network through which the communication with a data terminal or a called telephone subscriber's station is set up.

Still another object of the invention is to provide a telephone station which sets up a telephone communication in accordance with the first and second aforesaid methods without any manual intervention.

A further object of the invention is to provide a telephone station which detects all the tone or supervisory signals which are transmitted from all telephone exchanges over a telephone subscriber's line to initiate and distinguish the various phases in the call dialling of a communication.

A still further object of the invention is to provide a telephone station which transmits the first dialling digit in multifrequency code so as to detect if the linking exchange receives the dialling signals in multifrequency code or in pulse code.

SUMMARY OF THE INVENTION

In accordance with the aforementioned objects, a keyboard type telephone station embodying the invention comprises means for detecting at least one of supervising or tone signals which are transmitted on the telephone subscriber's line to the telephone station and which indicate the beginning of dialling phases in setting up a telephone communication. In response to detecting each supervisory or tone signal indicating the beginning of a phase, the detecting means controls means for blocking transmission of the pulse generator of the station and for releasing transmission of the multifrequency generator of the station in such a manner that only the multifrequency generator transmits only the dialling signal associated with the first key of the dialling phase the beginning of which is initialized by said supervisory signal. Then the detecting means controls the blocking and releasing means such that only the pulse generator transmits the dial pulse signals associated with said first key and with the subsequent keys of the dialling phase in response to further detection of the supervisory signal, or controls said blocking and releasing means such that only the multifrequency generator transmits the dialling multifrequency signals associated only with the said subsequent keys, in response to the non-detection of the supervisory signal.

Thus, in setting up a telephone communication according to the invention under the second method, in the simple case in which the telephone connection is made by way of an automatic telephone exchange which is connected to a data terminal and which allows transmission of first digits of the call number only in pulse code, after one dialling phase corresponding to a call digit, the detection means seeks a tone signal indicating the beginning of the next digit forming phase by means of the next digit transmission from the multifrequency signal generator which begins to transmit the first digit of the next dialling phase.

If the tone signal is detected, this corresponds to a pulse code transmission for the next dialling phase. The pulse generator transmits all the call digits of the next dialling phase including said first digit, whereas if the tone signal transmission is not detected, the multifrequency signal generator continues to transmit the following digits in multifrequency code.

Advantageously, the detecting means comprises one or more threshold detectors for the power level of the tone or supervisory signals or of predetermined tone signals, so as to adapt the telephone station to all methods of setting up a telephone communication.

BRIEF DESCRIPTION OF THE DRAWINGS

Further advantages of the invention will be more apparent from the description of one embodiment given hereinafter with reference to the accompanying drawings in which:

FIG. 2 is a detailed block diagram of the telephone station of FIG. 1; and

FIGS. 3A and 3B are time diagrams showing the signals set up in the telephone station in establishing a decimal pulse code call phase and a multifrequency code call phase respectively.

DESCRIPTION OF THE PREFERRED EMBODIMENT

Figure 1:
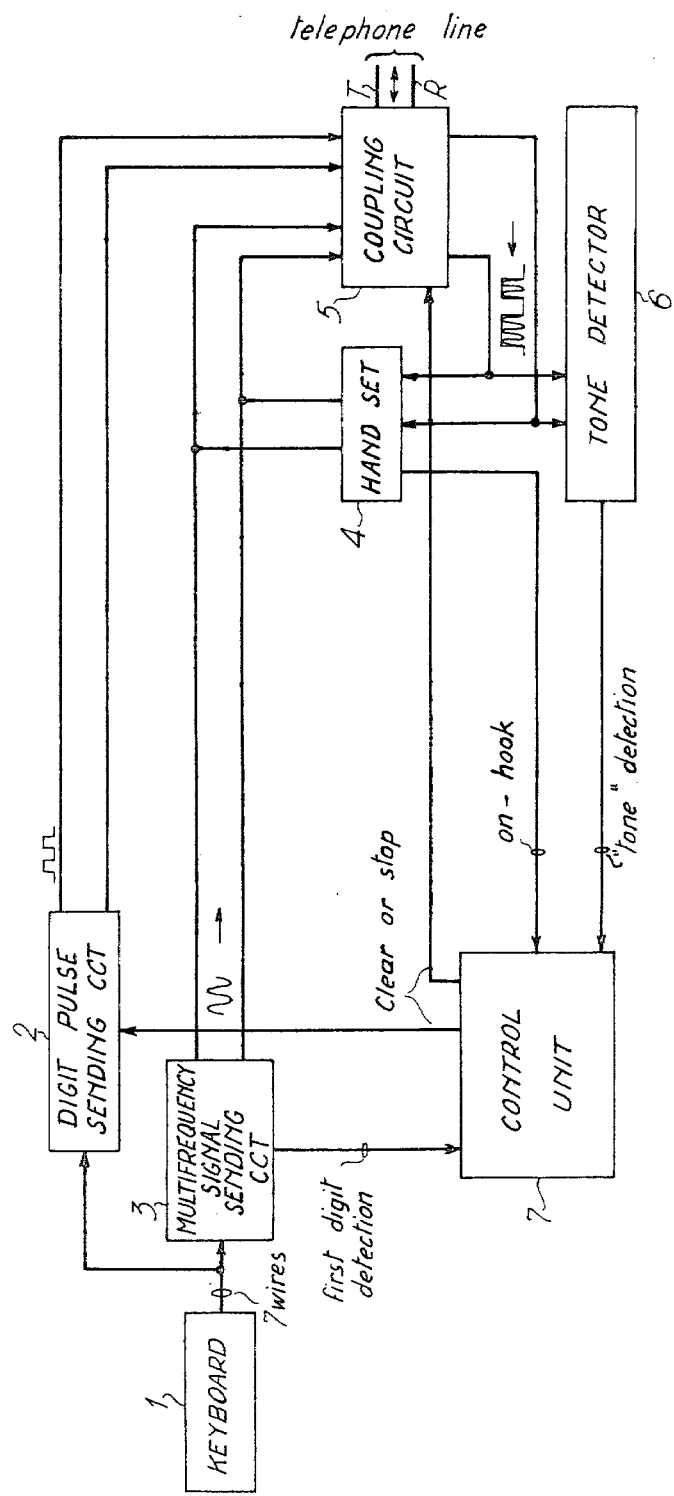
FIG. 1 is a general block diagram of a telephone station embodying the invention.

The diagram of FIG. 1 shows the general arrangement of the components which constitute a keyboard type telephone station embodying the invention. It comprises conventional components such as a keyboard 1 having twelve keys, a digit pulse sending circuit 2 and a multifrequency signal sending circuit 3. Each of the sending circuits transmits conventional dialling signals on pressing a key of the keyboard 1. The telephone station includes also a conventional audio circuit 4 comprising in known manner the earphone and the microphone of the handset. A coupling circuit 5 allows transmission and reception of dialling signals or data signals, and supervisory or tone signals, in setting up a communication over the telephone subscriber's line which consists of the two wires T and R and which is connected to the telephone network.

Through the coupling circuit 5 a tone or supervisory signal detector 6 detects the presence of tone or supervisory signals which indicate the beginning of various dialling phases in setting up a telephone call. The result of this detection is transmitted from the detector 6 to a control unit 7 which stops transmission of the dialling signals from one of the sending circuits 2 and 3 while the other transmits them.

The keyboard 1 comprises a conventional 3×4 dual-contacts matrix with associated twelve keys which are distributed over four horizontal rows and three vertical columns. Ten keys are associated with the numerals 0 through 9. Two keys such as the asterisk (*) key and the octothorp (#) key are used for dialing a call number of a subscriber as a data terminal. Each of the keys can be associated with the instructions to be transmitted to a called data terminal via the public telephone network. On pressing each key, two dual-contacts are closed to tell transcoders 20 and 30 of the generators 2 and 3 which of the three columns and which of the four rows the key belongs to.

Referring now to FIG. 2, each transcoder 20 and 30 converts the previous received information into binary coded decimal code to control a digit pulse generator 21 or a multifrequency signal generator 31 which transmits dialling signals corresponding to the pressed key.

In the first case, the digit pulse generator 21 produces along the wire 210 a conventional decimal code pulse train which has a number of dial pulses equal to the numeral or digit associated with the key, to open the telephone line loop by means of a breaker 50 which is connected in series on the transmission wire T of the telephone line. The breaker 50 is for example a relay or a field effect transistor gate. It will also be noted that during transmission of the dial pulse trains, the generator 21 causes, via the output wire 211, the disconnection of the assembly which includes the handset earphone 40 and the tone detector 6, and of the reception channel 510 of the hybrid coupler 51 of the coupling circuit 5 by means of the opening of a switch 52. This means that listening by the user is not obstructed and any erroneous detection of tone signals from the tone detector 5 cannot arise.

In the second case, the multifrequency signal generator 31 transmits a multifrequency code signal which is formed of two voice-frequencies out-of-eight associated with the pressed key. The voice-frequencies are those recommended by the International Telegraph and Telephone Consultative Committee. The two-frequency signal is transmitted into the coupling circuit 5 through a changeover switch 53 when in the position $P_1$, and which is connected to the transmission channel 511 of the hybrid coupler 51 which includes differential transformers or a diode bridge independently of the direction of the telephone line supply current. When in the position $P_0$, as shown in FIG. 2, the switch 53 connects the microphone 41 of the telephone station audio-circuit 4 to the transmission channel 511 of the coupler 51. The switch 53 is controlled through the wire 530 by the control unit 7. When the switch 53 is in position $P_1$, the microphone 40 is disconnected from the telephone line so as not to disturb transmission of voice frequencies. When the switch 53 is in position $P_0$, the switch 53 disconnects the multifrequency signal generator 31 during transmission of the pulse code signals.

In a preferred embodiment of the invention illustrated, a buffer memory 22 is connected in the digit pulse sending circuit 2 between the transcoder 20 and the pulse generator 21. In addition to its conventional role as a buffer to adapt the manipulation speed of the keyboard 1 to the duration of the dial pulse trains emitted for each pressed key and for each digit, the buffer memory 22 is also used under the control of the unit 7 through the wire 220 to retransmit a digit or a numeral in decimal pulse code when it has not been previously accepted in multifrequency code, for example by the telephone exchange linking the telephone station, as will be explained hereinafter.

The tone detector 6 and the control unit 7 embodying this invention will now be described.

Starting from the reception channel 510 of the hybrid coupler 51, the tone detector 6 comprises in the following order an amplifier 60, a first Schmitt trigger 61, an integrator 62 and a second Schmitt trigger 63 transmitting the "tone presence" information over the output wire 64 to the control unit 7. The supervisory or tone signals or the like designed for the remote data processing are generally pulse signals generated by clipping alternating current, or fixed frequency signals transmitted by the exchange or the automatic exchange linked to the telephone station. The first Schmitt trigger 61 determines the received instantaneous current level, and the second Schmitt trigger detects the average current level of a tone signal. Consequently, the tone detector 6 is a threshold detector for the average power of the tone signals, and not a detector for the determined frequency or frequencies of the tone signals or other supervisory signals. The lower and upper thresholds of the Schmitt triggers 61 and 63 are advantageously chosen to only detect all the tone signals at present in force, whether clipped or not, and at the usual voice-frequencies equal to 425, 850, 500 or 1000 Hz for example.

As shown to FIG. 2, the control unit 7 is a logic unit which comprises essentially two flip-flops 70 and 71, a monostable multivibrator 72, a zero-setting circuit 73 for setting the flip-flops 70, 71 and a first digit detector 74 to zero (RAZ), the first digit detector 74 which detects the first multifrequency signal of each phase in setting up a telephone communication, and further logic gates described hereinafter. The first digit detector 74 and the two flip-flops 70 and 71 are reset to zero by the zero-setting circuit 73 either when the subscriber replaces the handset of the telephone station, which corresponds to the transmission of an on-hook signal on the wire 42 from the audio-circuit 4 to the circuit 73 via an OR-gate 78, or at the beginning of indication of the "presence of a tone" which corresponds to the transmission of a "presence of tone" signal on the control wire 64 from the tone detector 6 to the zero-setting circuit 73 via the OR-gate 78.

The operation of the telephone station is as follows, with reference to the time diagrams of FIGS. 3A and 3B, for a dialling phase which is initialized by the detection of a tone signal from the detector 6. At the beginning of this phase, the state of the wire 64 is zero, and the complementary output $\overline{Q}$ of the flip-flop 71 controlling the buffer memory 22 of the digit pulse sending circuit 2 is in state "1" so as to lock the reading circuit for the memory 22.

When the tone detector 6 receives a tone signal and this is received by the earphone 40, a key of the keyboard 1 corresponding to the first digit of the dialling phase is pressed. The multifrequency signal generator 31, which is always in a state of operation in accordance with the illustrated embodiment, transmits the combination of two selected voice-frequencies on the transmission channel 511 through the switch 53 to the telephone line for the time during which the two keyboard dual-contacts associated with the key are closed. Simultaneously, the first digit detector 74 transmits a rectangular wave over its output wire 740 for the time during which the preceding contacts are closed. This rectangular wave is transmitted through an OR-gate 75 and an AND-gate 76 to maintain or to put the switch 53 into the position $P_1$. Thus, the microphone 41 is disconnected from the telephone line T-R.

On releasing the key, the wire 740 produces the state "0" on the input of an inverter 79 which is connected to the output of the first digit detector 74. This state change allows transmission a rectangular wave over the output wire 720 of the monostable multivibrator 72. The rectangular wave has a predetermined duration $\Delta t$, for example of the order of 30 ms, so allowing detection to be made of whether the dialling phase underway has to be transmitted in pulse code or must continue in multifrequency code. This selection criterion is determined by the state of the wire 64 at the end of the rectangular wave of duration Δt following transmission of the first digit in multifrequency code.

(a) As shown in FIG. 3A, if the wire 64 is still in the "1" state, this indicates that the tone is still present, i.e. it is impossible for the linking exchange to receive multifrequency code signals for this dialling phase. In this case, the dialling signals must be transmitted in decimal pulse code. The clock pulse transmitted from the monostable multivibrator 72 through an inverter 721 to the flip-flop 70 and to an intermediate AND-gate 77 which is interconnected between the output $\bar{Q}$ of the flip-flop 70 and the clock input C of the flip-flop 71, enables the complementary outputs $\bar{Q}$ of the flip-flops 70, 71 to be put into the "0" state. The J and K inputs of flip-flop 70 which is designed to maintain the selected code after transmission of the first digit in multifrequency code, are always at "1" state and "0" state respectively, and the K input of the flip-flop 71 is always at "0" state. The reading cotrol wire 220 for the buffer memory 22 in the "0" state then allows transfer of the digits in binary coded decimal code from the memory 22 to the generator 21, and in particular the first digit of this dialling phase. Simultaneously, as the inputs of the AND-gate 76 are at "0", the switch 53 passes to the $P_O$ position to inhibit transmission of the other digits in multifrequency code. Likewise during the entire transmission of the decimal code pulse trains, the control wire 211 of the digit pulse generator 21 is in the "1" state, so that the earphone 40 and the tone detector 6 are disconnected from the hybrid coupler 51 by opening the switch 52.

(b) If the output wire 64 of the tone detector 6 is in the "0" state either after or during transmission of the first digit in multifrequency code, as shown in FIG. 3B, this means that the linking exchange has recorded said first digit, and consequently the dialling can continue in multifrequency code. In this case, as the J input of the flip-flop 71 is in the "0" state, the clock pulse corresponding to the end of the rectangular wave of duration Δt transmitted over the wire 720 by the monostable multivibrator 72 has no effect on the state of the flip-flop 71. Reading of the memory 22 remains locked, and the switch 53 remains in position $P_1$.

At the end of the pulse code dialling phase in accordance with the previous paragraph (a), the detection of a new tone signal enables a new dialling phase in accordance with one of the previous paragraphs (a) and (b) to begin. In contrast, if the dialling phase in multifrequency code is to be followed by a new phase, this latter is automatically provided in multifrequency code in accordance with paragraph (b), because pulse transmission then causes loop interruption, which is interpreted by the linking exchange as an on-hooking of the handset and consequently as the end of the communication or of the call.

In all cases when the calling party replaces the handset, the opening of the switch hooks of the audio-circuit 4 causes the flip-flops 70 and 71 to return to zero by way of the wire 42, the OR-gate 78 and the zero-setting circuit 73, and causes again the re-initialization of the first digit detector 74, in a manner analogous to detecting a tone signal.

In FIG. 2, a single detector 6 is shown for detecting all the tone or supervisory signals. This detector could be replaced by one or more threshold detectors which are suitably adjusted to detect selectively the tone signals or predetermined tone signals. Among other things, this enables detection to be improved, and consequently prevents detection of false tone signals due to the noise on the telephone line, for example.

It is to be understood that other modifications and changes to the structure and arrangement of the telephone station can be made by those skilled in the art without departing from the spirit of the invention.

For example, during a dialling phase in pulse code, the digits could be simultaneously transmitted in multifrequency code, this being without any inconvenience to the recording of the dialled digits by the linking telephone exchange. The transcoders 20 and 30 could also be replaced by a single transcoder connected to the generators 21 and 31 through a memory analogous to the described memory 22. In this case, the control signal such as on the wire 220 for inhibiting the transmission of the pulse code digits is directly applied from the output $\bar{Q}$ of the flip-flop 71 of the control unit 7 to a suitable input of the pulse generator 21 or to its output. Finally, the transmission duration of the two-voice-frequency groups can be a predetermined duration, which is independent of the pressing of the key. The end of this transmission directly causes at least for the first digit the subsequent transmissions of the pulse generator 21 to either remain locked or to be released.

What I claim is:

1. A telephone station connected to a telephone network by a telephone subscriber's line adapted for automatic switching between pulse code dialling and frequency code dialling comprising:

a keyboard with a plurality of keys;

means controlled by said keyboard for generating call digit pulse trains which are associated with the keyboard keys respectively;

means controlled by said keyboard for generating call digit multifrequency signals which are associated with said keyboard keys respectively;

an audio circuit for said telephone station;

a coupling circuit for connecting said generating means and the telephone station audio-circuit to said telephone line;

means for blocking pulse train transmission from said pulse train generating means and simultaneously releasing multifrequency signal transmission from said multifrequency signal generating means or vice versa;

said telephone network including supervisory signal generating means;

means for detecting supervisory signals which are transmitted from said telephone network and which indicate start the of various call phases in setting up a telephone communication;

said detecting means controlling said blocking and releasing means in response to detection of each of said supervisory signals so that only said multifrequency signal generating means transmits over said telephone line only the multifrequency signal associated with the first key of a dialling call pulse whose beginning is indicated by the detection of a corresponding supervisory signal; and said detecting means thereafter controlling said blocking and releasing means in response to further detection of said corresponding supervisory signal, so that only said pulse train generating means transmits over said telephone lint the pulse train associated with said first key and then said pulse trains associated with the subsequent keys of said call dialling pulses and in response to the non-detection of said corresponding supervisory signal so that only said multifrequency signal generating means transmits over said telephone line said multifrequency signals associated only with said subsequent keys.

2. A telephone station according to claim 1, in which said detecting means comprises at least one current threshold detector for the power level of said supervisory signals.

3. A telephone station according to claim 2, in which said threshold detector comprises at least one first Schmitt trigger, the input of which receives said supervisory signals from said telephone line and a second Schmitt trigger which controls said blocking and releasing means for indicating the presence or the absence of a supervisory signal over said telephone line and further includes an integrating means connected to the output of said first Schmitt trigger and the input of said second Schmitt trigger.

4. A telephone station connected to a telephone network by a telephone subscriber's line comprising:
- a keyboard with a plurality of keys;
- means controlled by said keyboard for generating call digit pulse trains which are associated with the keyboard keys respectively;
- means controlled by said keyboard for generating call digit multifrequency signals which are associated with said keyboard keys respectively;
- an audio circuit for said telephone station;
- a coupling circuit connecting said generating means and the telephone station audio-circuit to said telephone line;
- means for simultaneously blocking pulse train transmission from said pulse train generating means and for releasing multifrequency signal transmission from said multifrequency signal generating means or vice versa;
- said telephone network including a supervisory signal generating means;
- means for detecting the supervisory signals which are various call dialling pulses in setting up a telephone communication;
- said detecting means controlling said blocking and releasing means in response to detection of each of said supervisory signals so that only said multifrequency signal generating means transmits over said telephone line only the multifrequency signal associated with the first key of a dialling call pulse the beginning of which is indicated by the detection of a corresponding supervisory signal;
- said detecting means then controlling said blocking and releasing means in response to further detection of said conrresponding supervisrory signal, so that only said pulse train generating means transmits over said telephone line the pulse train associated with said first key and then said pulse train associated with the subsequent keys of said dialling phase and in response to the non-detection of said corresponding supervisory signal only said multifrequency signal generating means transmitting over said telephone line said multifrequency signals associated with the subsequent keys;
- means connected to said multifrequency signal generating means for detecting the end of the multifrequency signal transmission associated with said first key of each of said dialling phases; and
- timing means triggered by said first key multifrequency signal transmission end detecting means for controlling said blocking and releasing means so as to block said multifrequency signal transmission from said multifrequency generating means and simultaneously release said pulse train transmission from said pulse train generating means when said corresponding supervisory signal is again detected after transmission of the multifrequency code signal corresponding to said first key.

5. A telephone station connected to the telephone network by a telephone subscriber's line comprising:
- a keyboard with a plurality of keys;
- means controlled by said keyboard for generating call digit pulse trains which are associated with the keyboard keys respectively;
- means controlled by said keyboard for generating call digit multifrequency signals which are associated with said keyboard keys respectively;
- an audio credit for said telephone station;
- a circuit for coupling said generating means and the telephone station audio-circuit to said telephone line;
- means for simultaneously blocking pulse train transmission from said pulse train generating means and for releasing multifrequency signal transmission from said multifrequency signal generating measn for vice versa;
- said telephone network including a supervisory signal generating means;
- means for detecting the supervisory signals which are transmitted from said telephone network and which indicate the start of various call dialling pulses in setting up a telephone communication;
- said detecting means controlling said blocking and releasing means in response to detection of each of said supervisory signals so that only said multifrequency signal generating means transmits over said telephone line only the multifrequency signal associated with the first key of dialling call pulse the beginning of which is indicated by the detection of a corresponding supervisory signal;
- said detecting means then controlling said blocking and releasing means in response to further detection of said corresponding supervisory signal, so that only said pulse train generating means transmits over said telephone line the pulse train associated with said first key and then said pulse trains associated with the subsequent keys of said dialling phase and in response to the non-detection of said perdetermined supervisory signal only said multifrequency signal generating means transmitting over said telephone line said multifrequency signals associated with the subsequent keys; and
- detection means connected to said audio-circuit of said telephone station and to said supervisory signal detecting means for controlling said blocking and releasing means so as to block said pulse train transmission from said pulse train generating means and simultaneously release the multifrequency signal transmission from said multifrequency signal generating means in response to the on-hook operation of the hendset of said telephone station or in response to the detection of another supervisory signal.

6. A telephone station connected to the telephone network by a telephone subscriber's line comprising:
- a keyboard with a plurality of keys;
- a generator for generating call digit pulse trains which are associated with and controlled by the keyboard keys;

a buffer memory interconnected between said keyboard and the input of said pulse train generator for adapting the manipulation speed of said keyboard to the duration of the pulse train generated for each pressed key;

means for generating call digit multifrequency signals which are associated with and controlled by said keyboard keys;

an audio circuit for said telephone station;

a circuit for coupling said generator, said generating means and the audio-circuit of said telephone station to said telephone line;

means for controlling the reading of said memory buffer thereby obtaining the blocking or releasing of a pulse train transmission from said pulse train generator;

said telephone network including a supervisory signal generating means;

means for detecting the supervisory signal transmitted from said telephone network which indicate the start of various call dialling pulses in setting up a telephone communication;

said detecting means controlling said memory buffer controlling means in response to detection of each of said supervisory signals so that said reading of said memory buffer is blocked and only said multifrequency signal generating means transmits over said telephone line only the multifrequency signal associated with the first key of a dialling call pulse the beginning of which is indicated by the detection of a corresponding supervisory signal;

said detecting means then controlling the memory buffer controlling means in response to further detection of said corresponding supervisory signal, so that said reading of said memory buffer is released and only said pulse train generator transmits over said telephone line the pulse train associated with said first key and then said pulse trains associated with the subsequent keys of said dialling pulse; and said detecting means controlling the memory buffer in response to the non-detection of said predetermined supervisory signal so that said reading of said memory buffer is blocked only by said multifrequency signal generating means transmitting over said telephone line said multifrequency signals associated only with said subsequent keys.

* * * * *